United States Patent
Simonsen et al.

(10) Patent No.: US 12,414,570 B2
(45) Date of Patent: Sep. 16, 2025

(54) SOLID ENZYMATIC ARTICLE FOR USE IN BAKING

(71) Applicants: Novozymes A/S, Bagsvaerd (DK); Puratos NV/SA, Groot-Bijgaarden (BE)

(72) Inventors: Ole Simonsen, Soeborg (DK); Katarina Larson, Malmoe (SE); Kjersti Slot Hansen, Vordingborg (DK); Karina Lundberg, Frederiksvaerk (DK); Tim Van Caelenberg, Groot-Bijgaarden (BE); Isabel Vanhuele, Groot-Bijgaarden (BE)

(73) Assignees: Novazymes A/S, Bagsvaerd (DK); Puratos NV/SA, Groot-Bijgaarden (BE)

( * ) Notice: Subject to any disclaimer, the term of this patent is extended or adjusted under 35 U.S.C. 154(b) by 581 days.

(21) Appl. No.: 15/734,891

(22) PCT Filed: Jun. 4, 2019

(86) PCT No.: PCT/EP2019/064524
§ 371 (c)(1),
(2) Date: Dec. 3, 2020

(87) PCT Pub. No.: WO2019/234042
PCT Pub. Date: Dec. 12, 2019

(65) Prior Publication Data
US 2021/0219559 A1    Jul. 22, 2021

(30) Foreign Application Priority Data
Jun. 4, 2018 (EP) .................... 18175748

(51) Int. Cl.
*A21D 8/04* (2006.01)
*A21D 2/18* (2006.01)
*A21D 2/22* (2006.01)
*A21D 10/00* (2006.01)
*A23P 10/28* (2016.01)

(52) U.S. Cl.
CPC ............ *A21D 8/042* (2013.01); *A21D 2/181* (2013.01); *A21D 2/22* (2013.01); *A21D 10/002* (2013.01); *A23P 10/28* (2016.08)

(58) Field of Classification Search
CPC .............................. A21D 8/042; A21D 10/002
See application file for complete search history.

(56) References Cited

U.S. PATENT DOCUMENTS

| | | | |
|---|---|---|---|
| 5,279,658 A | 1/1994 | Aung | |
| 5,650,188 A * | 7/1997 | Gaubert | A23D 9/05 426/654 |
| 5,885,618 A * | 3/1999 | Knap | A61K 9/2095 424/94.2 |
| 6,110,501 A | 8/2000 | Redding, Jr. et al. | |
| 2002/0054905 A1 | 5/2002 | Weisser et al. | |
| 2002/0094367 A1 * | 7/2002 | Fuglsang | A23L 7/107 426/94 |
| 2012/0207881 A1 * | 8/2012 | Noort | A23P 10/20 426/534 |
| 2016/0081356 A1 * | 3/2016 | Damgaard | A23K 20/189 426/63 |
| 2016/0235093 A1 * | 8/2016 | Brion | A23K 50/80 |
| 2017/0188592 A1 | 7/2017 | Lundkvist et al. | |

FOREIGN PATENT DOCUMENTS

| | | |
|---|---|---|
| EP | 1008309 A1 | 12/1998 |
| GB | 1537193 | 5/1997 |
| RU | 2158513 C1 | 11/2000 |

* cited by examiner

*Primary Examiner* — Jenna A Watts
(74) *Attorney, Agent, or Firm* — Eric J. Fechter

(57) ABSTRACT

The invention provides a method for preparing a solid enzymatic unit-dose article for use in baking, which is capable of disintegrating/dissolving during preparation of a dough or a batter.

16 Claims, No Drawings

SOLID ENZYMATIC ARTICLE FOR USE IN BAKING

CROSS-REFERENCE TO RELATED APPLICATIONS

This application is a 35 U.S.C. 371 national application of PCT/EP2019/064524, filed Jun. 4, 2019, which claims priority or the benefit from European Patent Application No. 18175748.5, filed Jun. 4, 2018. The contents of these applications are fully incorporated herein by reference.

FIELD OF THE INVENTION

The present invention relates to a method for preparing a solid enzymatic unit-dose baking article, which is capable of disintegrating/dissolving during preparation of a dough or a batter.

BACKGROUND

Enzymes have been used in the baking industry for many years. They have typically been supplied as powdered/granulated products, intended to be added in the baking process together with flour and other ingredients (such as yeast)—for example as a baking premix or as an improver. In baking, improvers are widely used for different properties such as dough or batter tolerance, or baked product volume and/or freshness. Usually, these improver formulations are manufactured as a powder composition, which has to be pre-dosed (manually or automatically) by weighing and consequently added during the dough mixing process.

The need for convenience and product safety is growing strongly throughout the baked goods chain. Reducing complexity by simplification of baking processes and product formats is key to reduce time loss and spills. Nowadays, granulated enzyme products are commonly used in industrial baking processes, usually as part of a powdered improver, and can be implemented in the baking process by using (semi-) automated dosage equipment. However, in semi-industrial and artisan bakeries the degree of automation is lower, and a desire exists for a more convenient and flexible enzyme or improver delivery system, preferably without pre-dosing or pre-treatment step before addition to the mixers.

Moreover, (inter) national regulators are putting focus on the health & safety risks (rhinitis) of airborne dust from bakery ingredients, throughout the entire bakery chain, mostly related to the presence of fungal amylases present in flour and concentrated bakery ingredients (improvers). In general, reducing flour and enzyme dust exposure in bakeries will reduce the likelihood of work related respiratory symptoms. Flour and enzyme handling activities that may generate dust should be prevented to minimize the risk of exposures.

For above mentioned reasons, there is still a need for a product format that combines the aspects of convenience, flexibility, reliability and safety to be used as baking improver. Generating pre-dosed solid items containing functional bakery ingredients reduces pre-weighing processes of powder improvers (before addition to mixers), and as such dust formation and spills of concentrated bakery ingredients significantly. This invention relates to the production and application of a solid enzymatic unit-dose delivery format meeting these criteria.

Unit-dose delivery formats in the form of conventional tablets are produced by adding a free flowing compressible powder into a tablet mold and producing tablets by applying a high pressure with a piston. Such tablets are known in baking and usually exhibit a low friability, but have difficulties dissolving completely if added during preparation of a dough. Therefore, they are typically pre-dissolved in water. Compaction pressures of 100 to 200 MPa are typical for pharmaceutical tablets, while pressures greater than 200 MPa are common for dietary supplement tablets.

SUMMARY OF THE INVENTION

The present invention provides, in a first aspect, a method for preparing a solid enzymatic article weighing 1 to 100 grams, for use in baking, comprising
  (a) preparing a moist powder, comprising
    (i) 0.5 to 10% w/w of water,
    (ii) 0.01 to 20% w/w of active enzyme protein,
    (iii) at least 10% w/w of dough ingredient(s) selected from the group consisting of salts, sugars, starch, ascorbic acid, and combinations thereof, and
    (iv) at least 1% w/w of a binding agent selected from sugars and sugar alcohols;
  (b) forming the solid article by applying a pressure of 1 to 200000 kPa to the moist powder; and
  (c) drying the solid article to remove at least 30% of the water in the moist powder wherein the solid enzymatic article weighs 1 to 100 grams and comprise 0.01 to 20% w/w of active enzyme protein.

In another aspect, the invention provides a solid article for use in baking, which is prepared according to the first aspect of the invention.

In yet other aspects, the invention also provides methods for preparing a dough or a batter and a baked product.

Other aspects and embodiments of the invention are apparent from the description and examples.

DETAILED DESCRIPTION

We have found that it is possible to prepare a solid enzymatic article for use in the preparation of a dough for a baking process, which is capable of releasing the enzyme and other dough ingredients during preparation of the dough or mixing of the batter. Release of the enzyme and other ingredients from the solid article during mixing is particularly challenging, because the water concentration is low, and the shear forces applied during mixing are rather limited.

We found that preparing a unit-dose article by adding a small amount of water to a powder, and thus making a moist powder, pressing the moist powder to a unit-dose article (where much less pressure is needed than in a traditional tableting process), and subsequently drying the article, makes a unit-dose that has a low friability and can disintegrate during dough preparation without a pre-dissolving step.

The formulation of the solid enzymatic article is a delicate balance because it must be sufficiently fragile to disintegrate and/or dissolve at the right time (without a pre-dissolution step) during dough preparation, but also sufficiently tough to withstand handling (such as packaging handling and transportation) without releasing enzyme dust—it must exhibit a low friability. Enzyme dust causes allergy and must be kept at extremely low levels in the working environment.

We have found that a moist powder composition comprising enzyme, filler and a binding agent can be compressed to prepare a "sugar cube" like article, where the powder particles are glued together by the binding agent, and which has the above-mentioned handling and release properties-low friability and fast release.

The process is somewhat similar to the process used for preparing ordinary sugar cubes for hot drinks or pharmaceutical tablets, but in contrast, it creates "cubes" capable of dissolving in a dough at room temperature. Without being bound by theory, we believe the weak binding forces created via partly dissolution of a binding agent in the "cubes" are more easily broken/redissolved in the dough, which typically has a low amount of water—as compared to the strong binding forces created by high-pressure compaction in a conventional dry tableting process.

Even though the solid unit-dose article was developed for baking applications, it will be equally suitable as an enzyme delivery vehicle in dairy, and in other food or feed applications. Examples of such applications include for example, instant coffee, potato chips, and other applications where liquid non-food formulation ingredients, like glycerol, are not desirable.

Solid Enzymatic Article

The solid enzymatic article, according to the invention, is a solid enzyme dosage form for use in baking, which provides sufficient enzyme (and optionally also other functional ingredients) for preparing a dough. As such, the solid enzymatic article may also be referred to as a unit-dose article. It comprises one or more enzymes and one or more dough ingredient(s).

The solid enzymatic article is in a shaped physical form, but the exact physical form is not important for the function. The article is capable of breaking up and dissolving in the dough during mixing. After mixing, the enzyme(s) is/are evenly distributed throughout the dough. The unit-dose article of the invention may be suitable for applying enzyme to at least 2 kg of dough.

These properties are achieved by forming the article from a moist powder, which is compacted by applying a pressure of 1 to 200000 kPa; preferably 2 to 100000 kPa, more preferably 5 to 50000 kPa, even more preferably 5 to 10000 kPa, and most preferably 5 to 5000 kPa, or 10 to 1000 kPa. The compaction can be carried out in a mold, or by extruding the moist powder through a die and cutting the solid article into a desirable size before drying. Preferably compaction is carried out in a mold (rigid frame) providing the shaped physical form, using a piston to compact the moist powder in the mold.

If the moist powder contains a low amount of water, a high pressure is needed for compaction; and if the moist powder contains a high amount of water, a low pressure is needed for compaction.

After compaction of the moist powder, the solid article is dried to remove at least 30% w/w, preferably at least 40%, and more preferably at least 50% of the water from the moist powder.

The friability of the resulting solid article may be lower than 15%, preferably lower than 10%, more preferably lower than 5%, as determined using Test Method B below.

The weight of the final solid enzymatic article of the invention may be 1 to 100 grams. In an embodiment, the weight of the solid article is 1 to 50 grams, preferably 1 to 30 grams, more preferably 1 to 20 grams, and most preferably 1 to 10 grams. The lower weight limit may also start at 3 grams, 6 grams, or 9 grams, resulting in weights of the final solid enzymatic article of the invention in the ranges of 3 to 100 grams, 6 to 100 grams, 9 to 100 grams, preferably 3 to 50 grams, 6 to 50 grams, or 9 to 50 grams, etc.

The volume of the final solid enzymatic article of the invention may be 1 to 100 mL (or cm3). In an embodiment, the volume of the solid article is 1 to 50 mL, preferably 1 to 30 mL, more preferably 1 to 20 mL, and most preferably 1 to 10 mL. The lower volume limit may also start at 3 mL, 6 mL, or 9 mL, resulting in volumes of the final solid enzymatic article of the invention in the ranges of 3 to 100 mL, 6 to 100 mL, 9 to 100 mL, preferably 3 to 50 mL, 6 to 50 mL, or 9 to 50 mL, etc.

Process for Preparing Solid Enzymatic Articles

The solid enzymatic article can be prepared by methods well-known in the art. Dry ingredients and water are mixed using various types of mixing equipment for solid-liquid mixing.

The moist powder for preparing the articles can be pressed or molded using a variety of equipment or methods including using tablet presses, extruders, Hersey drums, the Chambon process, the Elba process and the Vibro process described in e.g. *Cane Sugar Handbook: A Manual for Cane Sugar Manufacturers and Their Chemists,* 12th edition 1993 by James C. P. Chen and Chung Chi Chou or Beet-Sugar Handbook, 2007 by Mosen Asadi. The formed wet articles are subsequently dried (and eventually cooled) using methods (or a combination of methods) well-known in the art including simple oven drying, hot air convection drying (e.g. hot air tunnels), vacuum drying, dielectric drying (e.g. using micro-waves) or simply leaving the articles to equilibrate with ambient conditions, some of these methods being also described in above documents.

Moist Powder

Water

The moist powder contains 0.5 to 10% w/w of water, which is mixed with enzyme, dough ingredient(s), and binding agent, to form the moist powder. The water content is the total amount of water, which is added directly, or which is present in and thus comes from the other constituents of the moist powder. In an embodiment, the moist powder contains 0.5 to 8% w/w, or 1 to 10% w/w, preferably 1 to 8% w/w, of water.

In a preferred embodiment, the moist powder contains 0.5 to 10% w/w of added water, i.e., water that is added directly as a specific ingredient (for example as tap water) during preparation of the moist powder. Preferably, the moist powder contains 0.5 to 8% w/w of added water, or 1 to 10% w/w of added water, more preferably 1 to 8% w/w of added water.

Enzyme

The enzyme(s) used to prepare the moist powder is/are described below. The enzyme content of the moist powder is 0.01 to 20% w/w of active enzyme protein. In an embodiment, the enzyme content is 0.1 to 20% w/w of active enzyme protein, preferably 0.1 to 15% w/w of active enzyme protein, more preferably 0.5 to 15% w/w of active enzyme protein, and most preferably 0.5 to 10% w/w of active enzyme protein. Even though some baking ingredients like flour may contain trace amounts of enzymes, a further addition of enzymes is used to get the needed amount of active enzyme protein.

Dough Ingredient

The dough ingredient(s) is/are selected from the group consisting of salts, sugars, starch, ascorbic acid, and mixtures thereof. The moist powder comprises the dough ingredient(s) in a total amount of at least 10% w/w. In a particular embodiment, the moist powder comprises the dough ingredient(s) in a total amount of at least 20% w/w, preferably at least 30% w/w, more preferably at 40% w/w, and most preferably at least 50% w/w.

The moist powder may include other dough ingredients, such as, but not limited to, other oxidizing and/or reducing agent(s) such as cysteine, proteins, non-soluble carbohydrates such as fibers.

The salts, sugars, and starch of the dough ingredient(s) are any salt, sugar, and starch compatible with baking and baked products, and as such they may also be edible, i.e., suitable for use in food. Particularly preferred salts are sodium chloride and potassium chloride. The sugars may be chosen among the sugars defined below. Moreover, the sugars may have the dual role of being both a dough ingredient and a "binding agent" of the moist powder (see below). In a particularly preferred embodiment, the starch is added to moist powder as flour. The moist powder may comprise less than 35% w/w flour, such as less than 30% w/w flour.

Binding Agent

In addition to the dough ingredients, a binding agent is added to the moist powder in an amount of at least 1% w/w, preferable at least 2% w/w, and more preferably at least 5% w/w. The binding agent is selected from sugars and sugar alcohols. The purpose of the binding agent is to bind the particles of the moist powder together, and thus reducing the friability of the solid article. There is no upper limit of the amount of binding agent, because the low water content in the moist powder ensures that only a small amount of the binder is dissolved, and if more is present, it will stay undissolved on particulate form.

The binding agent comprised in the moist powder may have a solubility of at least 0.1 g per 100 ml of water at 20° C.

The sugar of the binding agent and the dough ingredients may consist of 1-20 monosaccharide units. This includes monosaccharides and oligosaccharides such as disaccharides and trisaccharides. Monosaccharides may be glucose, mannose, galactose, and fructose. Disaccharides may be sucrose, maltose, trehalose, isomaltose, cellubiose, melibiose, primeverose, rutinose, gentiobiose, and lactose. Trisaccharides may be maltotriose and raffinose. Other oligosaccharides may include fructo-oligosaccharides or inulin.

The sugar may be a starch hydrolysate produced by hydrolysis, for example with an average of 2-20 monomer glucose units, such as dextrin or maltodextrin. The sugar may be maltodextrin having a DE between 6 and 52. Maltodextrins with a DE above 20 are often referred to as glucose syrup.

The sugar alcohol may be a monomeric sugar alcohol, such as erythritol, arabitol, xylitol, mannitol, or sorbitol. Preferably, the sugar alcohol is sorbitol.

Even though the moist powder contains water (moisture), it retains powder properties. The water content does not change the powder to a suspension, and it is also not a gel.

The angle of repose of the moist powder is higher than the angle of repose of the powder without addition of water.

Enzymes

The enzymes used in the present invention are catalytic proteins, and the term "active enzyme protein" is defined herein as the amount of catalytic protein(s), which exhibits enzymatic activity. This can be determined using an activity based analytical enzyme assay. In such assays, the enzyme typically catalyzes a reaction generating a colored compound. The amount of the colored compound can be measured and correlated to the concentration of the active enzyme protein. This technique is well-known in the art. The active enzyme protein may be fungal or bacterial enzyme(s).

The enzyme(s) used in the preparation of, and as a component of, the solid article according to the invention is (are) any enzyme suitable for use in baking. In particular the enzyme(s) is (are) selected from the group consisting of aminopeptidase, amylase, alpha-amylase, maltogenic alpha-amylase, beta-amylase, lipolytic enzymes, carboxypeptidase, catalase,, chitinase, cutinase, cyclodextrin glycosyltransferase, deoxyribonuclease, esterase, galactanase, glucan 1,4-alpha-maltotetrahydrolase, glucanase, alpha-galactosidase, beta-galactosidase, glucoamylase, alpha-glucosidase, beta-glucosidase, hemicellulase, haloperoxidase, invertase, laccase, mannanase, mannosidase, oxidase, pectinolytic enzymes, peptidoglutaminase, peroxidase, phospholipase, phytase, polyphenoloxidase, proteolytic enzyme, ribonuclease, transglutaminase, xylanase, and mixtures thereof.

The glucoamylase for use in the present invention include glucoamylases having a sequence identity of at least 50%, at least 60%, at least 65%, at least 70%, at least 75%, at least 80%, at least 85%, at least 90%, at least 95%, at least 96%, at least 97%, at least 98%, or at least 99% to the amino acid sequence of the *Aspergillus niger* G1 or G2 glucoamylase (Boel et al. (1984), EMBO J. 3 (5), p. 1097-1102), the *A. awamori* glucoamylase disclosed in WO 84/02921, or the *A. oryzae* glucoamylase (Agric. Biol. Chem. (1991), 55 (4), p. 941-949).

The amylase may be fungal or bacterial, e.g., a maltogenic alpha-amylase from *B. stearothermophilus* or an alpha-amylase from *Bacillus*, e.g. *B. licheniformis* or *B. amyloliquefaciens*, a beta-amylase, e.g., from plant (e.g. soy bean) or from microbial sources (e.g., *Bacillus*), or a fungal alpha-amylase, e.g., from *A. oryzae*.

The maltogenic alpha-amylase may also be a maltogenic alpha-amylase as disclosed in, e.g., WO1999/043794; WO2006/032281; or WO2008/148845.

Suitable commercial maltogenic alpha-amylases include NOVAMYL, OPTICAKE 50 BG, and OPTICAKE 3D (available from Novozymes A/S). Suitable commercial fungal alpha-amylase compositions include, e.g., BAKEZYME P 300 (available from DSM) and FUNGAMYL 2500 SG, FUNGAMYL 4000 BG, FUNGAMYL 800 L, FUNGAMYL ULTRA BG and FUNGAMYL ULTRA SG (available from Novozymes A/S).

An anti-staling amylase may also be an amylase (glucan 1,4-alpha-maltotetrahydrolase (EC 3.2.1.60)) from, e.g., *Pseudomonas*, such as any of the amylases disclosed in WO1999/050399, WO2004/111217, or WO2005/003339.

The glucose oxidase may be a fungal glucose oxidase, in particular an *Aspergillus niger* glucose oxidase (such as GLUZYMER, available from Novozymes A/S).

The lipolytic enzyme is an enzyme (EC 3.1.1) having lipase, phospholipase and/or galactolipase activity; especially an enzyme having lipase and phospholipase activity.

The lipase exhibit triacylglycerol lipase activity (EC 3.1.1.3), i.e., hydrolytic activity for carboxylic ester bonds in triglycerides, e.g., tributyrin.

The phospholipase exhibit phospholipase activity (A1 or A2, EC 3.1.1.32 or 3.1.1.4), i.e., hydrolytic activity towards one or both carboxylic ester bonds in phospholipids such as lecithin.

The galactolipase exhibit galactolipase activity (EC 3.1.1.26), i.e., hydrolytic activity on carboxylic ester bonds in galactolipids such as DGDG (digalactosyl diglyceride).

The hemicellulase may be a pentosanase, e.g., a xylanase which may be of microbial origin, e.g., derived from a bacterium, such as a strain of *Bacillus*, in particular a strain of *B. subtilis*, or a strain a strain of *Pseudoalteromonas*, in particular *P. haloplanktis*, or derived from a fungus, such as a strain of *Aspergillus*, in particular of *A. aculeatus, A. niger,*

*A. awamori*, or *A. tubigensis*, from a strain of *Trichoderma*, e.g., *T. reesei*, or from a strain of *Humicola*, e.g., *H. insolens*.

Suitable commercially available xylanase preparations for use in the present invention include PANZEA BG, PENTOPAN MONO BG and PENTOPAN 500 BG (available from Novozymes A/S), GRINDAMYL POWERBAKE (available from DuPont), and BAKEZYME BXP 5000 and BAKEZYME BXP 5001 (available from DSM).

The protease may be from *Bacillus*, e.g., *B. amyloliquefaciens* or from *Thermus aquaticus*.

Dough

In one aspect, the invention discloses a method for preparing dough, or a baked product prepared from the dough, which method comprises incorporating into the dough a solid enzymatic article according to the invention.

The present invention also relates to methods for preparing a dough or a baked product comprising incorporating into the dough an effective amount of a solid enzymatic article of the present invention which improves one or more properties of the dough or the baked product obtained from the dough, relative to a dough or a baked product in which the solid enzymatic article is not incorporated.

The phrase "incorporating into the dough" is defined herein as adding a solid enzymatic article according to the invention to the dough, to any ingredient from which the dough is to be made, and/or to any mixture of dough ingredients from which the dough is to be made. In other words, the solid article of the invention may be added in any step of the dough preparation and may be added in one, two or more steps. The solid article is added to the ingredients of dough that may be kneaded or mixed and baked to make the baked product using methods well known in the art.

The term "effective amount" is defined herein as an amount of the solid enzymatic article according to the invention that is sufficient for providing a measurable effect on at least one property of interest of the dough and/or baked product. Effective amount also includes fraction(s) of solid enzymatic article or more than one solid enzymatic article per dough and/or baked product.

Non-limiting examples of properties of interest are dough tolerance, rheology (stickiness, elasticity, extensibility) machinability, baked product volume, softness, resilience, cohesiveness, elasticity, crust colour, sliceability, and/or short bite.

The term "dough" is defined herein as a mixture of flour and other ingredients firm enough to knead or roll. In the context of the present invention, batters are encompassed in the term "dough".

The dough of the method of the invention may comprise flour derived from any cereal grain or other sources, including wheat, emmer, spelt, einkorn, barley, rye, oat, corn, sorghum, rice, millet, amaranth, quinoa, and cassava.

The dough may also comprise other conventional dough ingredients, e.g., proteins, such as milk powder, gluten, and soy; eggs (either whole eggs, egg yolks, or egg whites); an oxidant such as ascorbic acid, potassium bromate, potassium iodate, azodicarbonamide (ADA) or ammonium persulfate; an amino acid such as L-cysteine; a sugar; a salt such as sodium chloride, calcium acetate, sodium sulfate, or calcium sulfate, gum(s), fibre(s), preservatives, and/or an emulsifier.

The dough may comprise one or more lipid material (such as e.g. margarine, butter, oil, shortening), eventually in granular form.

The dough may be gluten-free dough.

The dough of the method of the invention may be fresh, frozen or par-baked (pre-baked). The dough of the method of the invention is a non-leavened dough, a leavened dough or a dough to be subjected to leavening.

The dough may be leavened in various ways, such as by adding chemical leavening agents, e.g., baking powder, sodium bicarbonate, or by adding a leaven (fermenting dough), but it is preferred to leaven the dough by adding a suitable yeast culture, such as a culture of *Saccharomyces cerevisiae* (baker's yeast), e.g., a commercially available strain of *S. cerevisiae*.

Emulsifiers

For some applications, an emulsifier is not needed; for some applications an emulsifier may be needed.

A suitable emulsifier for use in the present invention is preferably an emulsifier selected from the group consisting of diacetyl tartaric acid esters of monoglycerides (DATEM), sodium stearoyl lactylate (SSL), calcium stearoyl lactylate (CSL), ethoxylated mono- and diglycerides (EMG), distilled monoglycerides (DMG), polysorbates (PS), succinylated monoglycerides (SMG), propylene glycol monoester, sorbitan emulsifiers, polyglycerol esters, sucrose esters and lecithin.

In some applications, the lipolytic enzyme according to the present invention replaces part, or even all, of the emulsifier(s) usually present in the dough recipe.

Baked Product

The process of the invention may be used for any kind of baked product prepared from dough, particular of a soft character, either of a white, light or dark type. Non-limiting examples are bread (in particular white, whole-meal or rye bread), typically in the form of loaves or rolls, soft rolls, bagels, donuts, Danish pastry, puff pastry, laminated baked products, steamed buns, hamburger rolls, pizza, pita bread, ciabatta, sponge cakes, cream cakes, pound cakes, muffins, cupcakes, steamed cakes, waffles, brownies, cake donuts, yeast raised donuts, baguettes, rolls, crackers, biscuits, cookies, pie crusts, rusks and other baked products.

Further Embodiments of the Invention Include

Embodiment 1. A method for preparing a solid enzymatic article in a shaped form weighing 1 to 100 grams, for use in baking, comprising
 (a) preparing a moist powder, comprising
  (i) 0.5 to 10% w/w of water,
  (ii) 0.01 to 20% w/w of active enzyme protein,
  (iii) at least 10% w/w of dough ingredient(s) selected from the group consisting of salts, sugars, starch, ascorbic acid, and combinations thereof, and
  (iv) at least 1% w/w of a binding agent selected from sugars and sugar alcohols;
 (b) forming the solid article by applying a pressure of 1 to 200000 kPa to the moist powder; and
 (c) drying the solid article to remove at least 30% of the water in the moist powder
 wherein the solid enzymatic article weighs 1 to 100 grams and comprise 0.01 to 20% w/w of active enzyme protein.

Embodiment 2. The method of embodiment 1, wherein the solid article weighs 1 to 50 g.

Embodiment 3. The method of embodiment 1, wherein the solid article weighs 1 to 30 g.

Embodiment 4. The method of embodiment 1, wherein the solid article weighs 1 to 20 g.

Embodiment 5. The method of embodiment 1, wherein the solid article weighs 1 to 10 g.

Embodiment 6. The method of embodiment 1, wherein the solid article weighs 3 to 100 g.

Embodiment 7. The method of embodiment 1, wherein the solid article weighs 3 to 50 g.

Embodiment 8. The method of embodiment 1, wherein the solid article weighs 3 to 30 g.

Embodiment 9. The method of embodiment 1, wherein the solid article weighs 3 to 20 g.

Embodiment 10. The method of embodiment 1, wherein the solid article weighs 6 to 100 g.

Embodiment 11. The method of embodiment 1, wherein the solid article weighs 6 to 50 g.

Embodiment 12. The method of embodiment 1, wherein the solid article weighs 6 to 30 g.

Embodiment 13. The method of embodiment 1, wherein the solid article weighs 9 to 100 g.

Embodiment 14. The method of embodiment 1, wherein the solid article weighs 9 to 50 g.

Embodiment 15. The method of embodiment 1, wherein the solid article weighs 9 to 30 g.

Embodiment 16. The method of embodiment 1, wherein the volume of the solid article is 1 to 100 mL.

Embodiment 17. The method of embodiment 1, wherein the volume of the solid article is 1 to 50 mL.

Embodiment 18. The method of embodiment 1, wherein the volume of the solid article is 1 to 30 mL.

Embodiment 19. The method of embodiment 1, wherein the volume of the solid article is 1 to 20 mL.

Embodiment 20. The method of embodiment 1, wherein the volume of the solid article is 1 to 10 mL.

Embodiment 21. The method of embodiment 1, wherein the volume of the solid article is 3 to 100 mL.

Embodiment 22. The method of embodiment 1, wherein the volume of the solid article is 3 to 50 mL.

Embodiment 23. The method of embodiment 1, wherein the volume of the solid article is 3 to 30 mL.

Embodiment 24. The method of embodiment 1, wherein the volume of the solid article is 3 to 20 mL.

Embodiment 25. The method of embodiment 1, wherein the volume of the solid article is 6 to 100 mL.

Embodiment 26. The method of embodiment 1, wherein the volume of the solid article is 6 to 50 mL.

Embodiment 27. The method of embodiment 1, wherein the volume of the solid article is 6 to 30 mL.

Embodiment 28. The method of embodiment 1, wherein the volume of the solid article is 9 to 100 mL.

Embodiment 29. The method of embodiment 1, wherein the volume of the solid article is 9 to 50 mL.

Embodiment 30. The method of embodiment 1, wherein the volume of the solid article is 9 to 30 mL.

Embodiment 31. The method of any one of embodiments 1-30, wherein the moist powder comprises 0.5 to 8% w/w of water.

Embodiment 32. The method of any one of embodiments 1-31, wherein the moist powder comprises 1 to 10% w/w of water.

Embodiment 33. The method of any one of embodiments 1-32, wherein the moist powder comprises 1 to 8% w/w of water.

Embodiment 34. The method of any one of embodiments 1-33, wherein the moist powder comprises at least 20% w/w of dough ingredient(s) selected from the group consisting of salts, sugars, starch, ascorbic acid, and combinations thereof.

Embodiment 35. The method of any one of embodiments 1-34, wherein the moist powder comprises at least 30% w/w of dough ingredient(s) selected from the group consisting of salts, sugars, starch, ascorbic acid, and combinations thereof.

Embodiment 36. The method of any one of embodiments 1-35, wherein the moist powder comprises at least 40% w/w of dough ingredient(s) selected from the group consisting of salts, sugars, starch, ascorbic acid, and combinations thereof.

Embodiment 37. The method of any one of embodiments 1-36, wherein the moist powder comprises at least 50% w/w of dough ingredient(s) selected from the group consisting of salts, sugars, starch, ascorbic acid, and combinations thereof.

Embodiment 38. The method of any one of embodiments 1-37, wherein the dough ingredient(s) are selected from the group consisting of salts, sugars, starch, ascorbic acid, oxidizing and/or reducing agent(s), and combinations thereof.

Embodiment 39. The method of any one of embodiments 1-38, wherein the dough ingredient(s) are selected from the group consisting of salts, sugars, starch, ascorbic acid, cysteine, and combinations thereof.

Embodiment 40. The method of any one of embodiments 1-39, wherein the dough ingredient(s) are salts and/or sugars.

Embodiment 41. The method of any one of embodiments 1-40, wherein the salts, sugars, and starch are edible, i.e., suitable for use in food.

Embodiment 42. The method of any one of embodiments 1-41, wherein the salts are sodium chloride and/or potassium chloride.

Embodiment 43. The method of any one of embodiments 1-42, wherein the starch is added to the moist powder as flour.

Embodiment 44. The method of any one of embodiments 1-43, wherein the moist powder comprise less than 35% flour Embodiment 45. The method of any one of embodiments 1-44, wherein the moist powder comprise less than 30% flour.

Embodiment 46. The method of any one of embodiments 1-45, wherein the moist powder comprises at least 2% w/w of binding agent.

Embodiment 47. The method of any one of embodiments 1-46, wherein the moist powder comprises at least 5% w/w of binding agent.

Embodiment 48. The method of any one of embodiments 1-47, wherein the sugars of the binding agent and the dough ingredients consist of 1-20 monosaccharide units.

Embodiment 49. The method of any one of embodiments 1-48, wherein the sugars of the binding agent and the dough ingredients consist of 1-10 monosaccharide units.

Embodiment 50. The method of any one of embodiments 1-49, wherein the sugars of the binding agent and the dough ingredients consist of 1-5 monosaccharide units.

Embodiment 51. The method of any one of embodiments 1-50, wherein the sugars of the binding agent and the dough ingredients are selected from the group consisting of monosaccharides, disaccharides, trisaccharides, oligosaccharides, dextrin, maltodextrin, and combinations thereof.

Embodiment 52. The method of any one of embodiments 1-51, wherein the sugars of the binding agent and the dough ingredients are selected from the group consisting of monosaccharides, disaccharides, trisaccharides, oligosaccharides, and combinations thereof.

Embodiment 53. The method of any one of embodiments 1-52, wherein the sugars of the binding agent and the dough ingredients are selected from the group consisting of glucose, mannose, galactose, fructose, sucrose, maltose, trehalose, isomaltose, cellubiose, melibiose, primeverose, rutinose, gentiobiose, lactose, maltotriose, raffinose, fructooligosaccharides and inulin.

Embodiment 54. The method of any one of embodiments 1-53, wherein the sugars of the binding agent and the dough ingredients are selected from the group consisting of glucose, mannose, galactose, fructose, sucrose, maltose, trehalose, isomaltose, and lactose.

Embodiment 55. The method of any one of embodiments 1-54, wherein the sugars of the binding agent and the dough ingredients are glucose, fructose, sucrose, and/or lactose, and wherein the salts are sodium chloride and/or potassium chloride.

Embodiment 56. The method of any one of embodiments 1-55, wherein the sugar alcohol is a monomeric sugar alcohol.

Embodiment 57. The method of any one of embodiments 1-56, wherein the sugar alcohol is selected from the group consisting of erythritol, arabitol, xylitol, mannitol, and sorbitol.

Embodiment 58. The method of any one of embodiments 1-57, wherein the sugar alcohol is sorbitol.

Embodiment 59. The method of any one of embodiments 1-58, wherein the moist powder contains 0.1 to 15% w/w active enzyme protein.

Embodiment 60. The method of any one of embodiments 1-59, wherein the moist powder contains 0.5 to 15% w/w active enzyme protein.

Embodiment 61. The method of any one of embodiments 1-60, wherein the moist powder contains 0.5 to 10% w/w active enzyme protein.

Embodiment 62. The method of any one of embodiments 1-61, wherein the enzyme is one or more enzymes selected from the group consisting of amylase, lipase, hemicellulase, protease, transglutaminase, and oxidoreductase.

Embodiment 63. The method of any one of embodiments 1-62, wherein the enzyme is one or more enzymes selected from the group consisting of amylase, lipase, and hemicellulase.

Embodiment 64. The method of any one of embodiments 1-63, wherein the solid article is formed by applying a pressure of 1 to 200000 kPa to the moist powder.

Embodiment 65. The method of any one of embodiments 1-64, wherein the solid article is formed by applying a pressure of 2 to 100000 kPa to the moist powder.

Embodiment 66. The method of any one of embodiments 1-65, wherein the solid article is formed by applying a pressure of 5 to 50000 kPa to the moist powder.

Embodiment 67. The method of any one of embodiments 1-66, wherein the solid article is formed by applying a pressure of 5 to 10000 kPa to the moist powder.

Embodiment 68. The method of any one of embodiments 1-67, wherein the solid article is formed by applying a pressure of 5 to 5000 kPa to the moist powder.

Embodiment 69. The method of any one of embodiments 1-68, wherein the solid article is formed by applying a pressure of 10 to 1000 kPa to the moist powder.

Embodiment 70. The method of any one of embodiments 1-69, wherein the solid article is dried to remove at least 30% of the water from the moist powder.

Embodiment 71. The method of any one of embodiments 1-70, wherein the solid article is dried to remove at least 40% of the water from the moist powder.

Embodiment 72. The method of any one of embodiments 1-71, wherein the solid article is dried to remove at least 50% of the water from the moist powder.

Embodiment 73. The method of any one of embodiments 1-72, wherein the friability of the solid article is lower than 15%.

Embodiment 74. The method of any one of embodiments 1-73, wherein the friability of the solid article is lower than 10%.

Embodiment 75. The method of any one of embodiments 1-74, wherein the friability of the solid article is lower than 5%.

Embodiment 76. The method of any one of embodiments 1-75, wherein the moist powder comprises 0.5 to 10% w/w of added water.

Embodiment 77. The method of any one of embodiments 1-76, wherein the moist powder comprises 0.5 to 8% w/w of added water.

Embodiment 78. The method of any one of embodiments 1-77, wherein the moist powder comprises 1 to 10% w/w of added water.

Embodiment 79. The method of any one of embodiments 1-78, wherein the moist powder comprises 1 to 8% w/w of added water.

Embodiment 80. A solid article in a shaped form for use in baking, which is obtained by the method of any one of embodiments 1-79.

Embodiment 81. A method for preparing a dough, comprising mixing water, flour, and the solid article of embodiment 80.

Embodiment 82. A method for preparing a baked product, comprising
(a) preparing a dough by mixing water, flour, and the solid article of embodiment 80; and
(b) baking the dough.

The present invention is further described by the following examples which should not be construed as limiting the scope of the invention.

EXAMPLES

Chemicals were commercial products of at least reagent grade. White sugar was EU Grade 2.

Friability

Friability is the tendency for a tablet to chip, crumble or break following compression and/or friction. This tendency is normally confined to uncoated tablets and surfaces during handling or subsequent storage. For example, friability testing is used by the pharmaceutical industry to test the durability of tablets during transit.

Test Method A: As given in Ph. Eur. Chapter 2.9.7.

Test Method B: Two tablets are placed in a 50 ml Nunc tube (for tablets less than 5 g) or a 250 ml Nunc tube (for tablets larger than 5 g) and subsequently exposed to 100 revolutions in a 250 mm carrousel/rotator—e.g. a Stuart SB2 rotator. The two articles are weighed before and after (weighing the two largest parts left) the rotations, and the weight loss (as percent of the initial weight) is the friability.

Example 1

Preparation of Baking Articles

A moist powder was prepared by mixing the following ingredients in a beaker using a spoon:
- 18.0 gram Light Muscovado sugar (Dansukker)—contain about 1% water
- 39.4 gram Sodium Chloride (Suprasel Fine Salt, Akzo Nobel)

1.0 gram Enzyme mixture A (granular enzyme product containing alpha amylase and xylanase with a total active enzyme content of about 6% w/w and wheat flour as main carrier)

1.6 gram L-Ascorbic acid (Sigma W210901)

1.8 gram tap water

The resulting moist powder contained about 5% w/w water; and the content of sugar, salt and ascorbic acid was about 98% w/w. Solid enzymatic articles were prepared from the moist powder by adding 3.10 grams moist powder into a 20 mm diameter cylindrical metal form. Subsequently the moist powder was compressed in the form using a metal piston and a pressure of 24 kPa for 5 minutes. The moist item was subsequently dried over-night in a desiccator under light vacuum. After drying the weight was 3.02 grams (dimensions 20 mm diameter and approximately 10 mm height), which corresponds to removal of more than 50% of the water in the moist powder. Several solid enzymatic articles (also referred to as baking articles) were prepared using this procedure. The friability of the solid articles, as determined using Test Method B, was 2.6%.

Example 2

Test for Complete Disintegration of Baking Article

A dough was prepared by mixing the baking ingredients, including the solid enzymatic baking article, as shown in Table 1.

TABLE 1

Dough ingredients.

| Recipe (g) | |
|---|---|
| Flour (Crousti flour, Dossche Mills, Deinze, Belgium) | 2000 |
| Water | 1140 |
| Fresh baker's yeast | 100 |
| Sodium chloride | 34 |
| Baking article | 1 piece |

Process

Mix all ingredients (Table 1) in a Diosna SP24 for 2 min at slow speed and for 6 min at fast speed. The final dough temperature is around 26° C.

Baking article disintegration evaluation method and criteria a) Divide the obtained dough in parts of 50 g each.
b) Stretch each single part to the maximum extend
c) Control visually each single part on 1/residual Baking article pieces attached to or inside the dough and on 2/spots on the surface of the dough parts with a different color than the dough color.
d) Optionally, a light source (conventional UV-lamp) could be used in order to obtain a transparent view through the stretched dough parts to identify residual Baking article pieces more conveniently.

Example 3

Baking Trial

Three different doughs (A, B, C) were prepared by mixing the baking ingredients shown in Table 2. Dough A is prepared without enzymes, dough B is prepared with a traditional powdered baking enzyme product and powdered ascorbic acid, and dough C is prepared with the baking article of Example 1.

TABLE 2

Dough ingredients.

| Recipe (g) | A | B | C |
|---|---|---|---|
| Flour (Crousti flour, Dossche Mills, Deinze, Belgium) | 2000 | 2000 | 2000 |
| Water | 1140 | 1140 | 1140 |
| Fresh bakers yeast | 100 | 100 | 100 |
| Sodium chloride | 34 | 34 | 34 |
| Enzyme mixture A | — | 0.05 | — |
| L-ascorbic acid | — | 0.08 | — |
| Baking article from Example 1 | — | — | 1 piece |

Process a) Mix all ingredients in a Diosna SP24 for 2 minutes at slow speed and then for 6 minutes at fast speed. The final dough temperature was around 26° C. No residual pieces of the baking article were observed in or on the dough.
b) Perform a bulk fermentation for 5 min at room temperature (21° C.).
c) Scale 500 g dough.
d) Mould manually the breads.
e) Perform an intermediate proofing time of 20 min at room temperature (21° C.).
f) Mold on a Jac Unic with R5.5 and L16 and put the doughs in baking pans.
g) Proof for 80 min at 35° C. and 95% RH in a Koma fermentation room.
h) Perform a shock test on 50% of the doughs (the baking pans containing the doughs are dropped on the shelf from a height of 5.5 cm).
i) Prepare a bread by baking the dough for 35 minutes at 230° C. in a Miwe Condo oven.
j) Let the breads cool at room temperature.

The volume of the breads was measured using the commonly used rapeseed displacement method. The results are presented in Table 3.

TABLE 3

Bread volumes.

| Relative volume (compared to dough A) | A | B | C |
|---|---|---|---|
| Without shock test | 100 | 124 | 124 |
| With shock test | 81 | 111 | 112 |

The results show that the use of a solid enzymatic baking article of the invention gives similar performances as the use of traditional powdered baking enzymes.

Example 4

Preparation of Baking Articles with Low Friability

Three baking articles (I, II, and III) were prepared as described in Example 1 using the ingredients shown in Table 4 (where wheat flour (Meneba Kolibri with less than 15% water content) is used to represent the enzyme content). After drying (as in example 1 with more than 50% of the water removed), the friability was measured using method B.

TABLE 4

Ingredients and resulting friability

|  | I | II | III |
|---|---|---|---|
| Light Muscovado sugar* | 10.0% | 5.0% | 0.0% |
| Sodium Chloride* | 85.6% | 90.6% | 95.6% |
| Wheat Flour* | 1.7% | 1.7% | 1.7% |
| L-ascorbic acid* | 2.7% | 2.7% | 2.7% |
| Tap water ** | 3.0% | 4.0% | 3.0% |
| Resulting friability | 3.7% | 0.6% | 51% |

*expressed as percentage of the dry ingredients
** percent added water calculated on the sum of the other ingredients.

It can clearly be concluded that a certain amount of binding agent (e.g. sugar) is needed to obtain a low friability.

Example 5

Effect of Water Addition on Friability & Disintegration

A baking article (IV) was prepared by using the method of Example 1 (using a 23 mm diameter cylindrical metal form), using the formulations and compressing parameters as shown in Table 5. A granular enzyme mixture (Enzyme mixture B) with two alpha-amylases, xylanase and lipase was used, with a content of active enzyme protein of about 30%. At the end of the drying step (30° C. under vacuum over night) more than 50% of the added water was removed. Friability was measured using method B. Disintegration was tested as in Example 2. Results are presented in table 5.

TABLE 5

Ingredients, compressing parameters and resulting performances

|  | IV |
|---|---|
| Light Muscovado sugar * | 30.0% |
| Oat Fiber (Herbacel Classic Plus HF04, Herbafood) * | 20.0% |
| Sodium Chloride * | 26.2% |
| L-ascorbic acid * | 20.0% |
| Enzyme mixture B * | 3.8% |
| Tap water * | 14.1% |
| Pressure Time | 5 min. |
| Pressure Force | 31 kPa |
| Solid enzymatic baking article dry weight | 10.0 g |
| Resulting Friability | 0.11% |
| Resulting Disintegration | Insufficient |

* expressed as percentage of the sum of the dry ingredients
** percent added water calculated on the sum of the other ingredients In this example including a high addition of water, an insufficient disintegration in dough was observed.

Example 6

Other Compositions

Four solid enzymatic baking articles (V, VI, VII, VIII) were prepared using the method as discussed in Example 1, using the formulations and compressing parameters as shown in Table 6. Articles V, VII was prepared using a 25×25 mm cubic metal form, VI, VIII was prepared using a 23 mm diameter cylindrical metal form. For baking article V a granular enzyme mixture (Enzyme mixture C) was used, with a content of active enzyme protein of about 6% and wheat flour as main carrier. At the end of the drying step (V by incubating at 40° C. over night; VI, VII and VIII 30° C. under vacuum over night) more than 50% of the added water was removed. Friability was measured using method B. Disintegration was tested as in Example 2. Results are presented in table 6.

TABLE 6

Ingredients, compressing parameters and resulting performance

|  | V | VI | VII | VIII |
|---|---|---|---|---|
| Light Muscovado sugar * | — | 4.8% | 10% | 30% |
| Refined White Sugar (Tiense Suikerraffinaderij) * | 33.2% | — | — | — |
| Light Brown Sugar (ASR Group) * | 33.2% | — | — | — |
| Sodium Chloride * | — | — | 66.2% | 36.2% |
| Cellulose Fibers (Arbocel B800) * | — | — | — | 10.0% |
| L-ascorbic acid * | 20.0% | 80.0% | 20.0% | 20.0% |
| Enzyme mixture B * | — | 15.2% | 3.8% | 3.8% |
| Enzyme mixture C * | 13.6% | — | — | — |
| Tap water ** | 2.0% | 6.0% | 2.9% | 5.1% |
| Pressure Force | 36 kPa | 31 kPa | 31 kPa | 31 kPa |
| Pressure Time | 5 min. | 5 min. | 5 min. | 5 min. |
| Solid enzymatic baking article dryweight | 10.0 g | 10.0 g | 10.0 g | 10.0 g |
| Friability | 5.68% | 0.35% | 0.63% | 0.42% |
| Disintegration | Complete | Complete | Complete | Complete |

* expressed as percentage of the sum of the dry ingredients
** percent added water calculated on the sum of the other ingredients The results show that the use of different combinations of binding agent, dough ingredients, active enzyme protein and water for producing solid enzymatic baking article of the invention gives similar performances with respect to resulting friability and disintegration in a dough system.

Example 7

Effect of Pressure on Friability & Disintegration

One solid enzymatic baking article (IX) was prepared by using the method of Example 1 (using a 25×25 mm square form), using the formulation and compressing parameters as shown in Table 7. A granular alpha-amylase enzyme mixture was used, with a content of active enzyme protein of about 50%. At the end of the drying step (in 40° C. oven for 2 hours) more than 50% of the added water was removed. Friability was measured using method B. Disintegration was tested as in Example 2. Results are presented in table 7.

TABLE 7

Ingredients, compressing parameters and resulting performance

|  | IX |
|---|---|
| Refined White Sugar * | 56.6% |
| L-ascorbic acid * | 40.0% |
| Enzyme mixture * | 3.4% |
| Tap water ** | 0.6% |
| Pressure Time | 15 sec. |
| Pressure Force | 8700 kPa |
| Solid enzymatic baking article dry weight | 10.0 g |
| Friability | 4.5% |
| Disintegration | Complete |

* expressed as percentage of the sum of the dry ingredients
** percent added water calculated on the sum of the other ingredients The results show that the use of high pressure during the preparation of a solid enzymatic baking articles allows to obtain products with excellent friability and disintegration properties.

Example 8

Effect of Flour on Friability & Disintegration

Three baking articles (X, XI, XII) were prepared by using the method of Example 1 (using a 25×25 mm square form (X) or a 23 mm diameter circular form (XI and XII)), using the formulations and compressing parameters as shown in Table 8. The wheat flour used was Meneba Kolibri. A granular alpha-amylase enzyme mixture was used, with a content of active enzyme protein of about 50%. At the end of the drying step (in 40° C. oven for 2 hours) more than 50% of the added water was removed. Friability was measured using method B. Disintegration was tested as in Example 2. Results are presented in table 8.

TABLE 8

Ingredients, compressing parameters and resulting performance

|  | X | XI | XII |
|---|---|---|---|
| Light Brown sugar * | 26.6% | 16.6% | 16.6 |
| Wheat flour * | 30.0% | 40.0% | 40.0% |
| L-ascorbic acid * | 40.0% | 40.0% | 40.0% |
| Enzyme mixture * | 3.4% | 3.4% | 3.4% |
| Tap water ** | 5.0% | 10.0% | 6.0% |
| Pressure Time | 5 min. | 5 min. | 5 min. |
| Pressure Force | 27 kPa | 35 kPa | 35 kPa |
| Solid enzymatic baking article dry weight | 10.0 g | 10.0 g | 10.0 g |
| Friability | 12.7% | 1.0% | 24.1% |
| Disintegration | Complete | Insufficient | — |

\* expressed as percentage of the sum of the dry ingredients
\*\* percent added water calculated on the sum of the other ingredients The results show that it is possible to obtain solid enzymatic baking articles with good performances that contain up to 30% flour (percentage of the sum of the dry ingredients before addition of the water corresponding to 28.6 percent of the moist powder).

Example 9

Effect of Water Content and Drying Conditions on Friability & Disintegration

Four baking articles (XIII, XIV, XV, XVI) were prepared by using the method of Example 1 (using a 25×25 mm square form), using the formulations and process parameters as shown in Table 9. A granular enzyme mixture (Enzyme mixture C) was used, with a content of active enzyme protein of about 6% and wheat flour as main carrier. Friability was measured using method B. Disintegration was tested as in Example 2. Results are presented in table 9.

TABLE 9

Ingredients, process parameters and resulting performance

|  | XIII | XVI | XV | XVI |
|---|---|---|---|---|
| Refined White Sugar * | 4.8% | 4.8% | 4.8% | 4.8% |
| L-ascorbic acid * | 80.0% | 80.0% | 80.0% | 80.0% |
| Enzyme mixture C * | 15.2% | 15.2% | 15.2% | 15.2% |
| Tap water ** | 0% | 6.0% | 6.0% | 20% |
| Pressure Time | 5 min. | 5 min. | 5 min. | 5 min. |
| Pressure Force | 36 kPa | 36 kPa | 36 kPa | 36 kPa |
| Drying conditions | 40° C. 6 h | No drying | 40° C. 6 h | 40° C. 6 h |
| Solid enzymatic baking article dry weight | 10.0 g | 10.0 g | 10.0 g | 10.0 g |
| Solid enzymatic baking article dry matter | 10.0 g | 10.0 g | 10.0 g | 10.0 g |
| Friability | no cubes (powder) | 28.77% | 1.12% | no consistent shape |
| Disintegration | not assessed | not assessed | satisfactory | not assessed |

\* expressed as percentage of the sum of the dry ingredients
\*\* percent added water calculated on the sum of the other ingredients The results show that the drying conditions and the amount of water are important parameters to obtain solid enzymatic baking articles with good performances.

The invention claimed is:

1. A method for preparing a solid enzymatic article in a shaped form for use in baking, the method comprising:
   (a) preparing a moist powder, comprising:
      (i) 0.5 to 10% w/w of water,
      (ii) 0.01 to 20% w/w of active enzyme protein,
      (iii) at least 10% w/w of dough ingredient(s) selected from the group consisting of salts, sugars, starch, ascorbic acid, and combinations thereof,
      (iv) at least 1% w/w of a binding agent selected from sugars and sugar alcohols; and
      (v) less than 35% w/w flour;
   (b) forming the solid article by applying a pressure of 1 to 200000 kPa to the moist powder of (a); and
   (c) drying the solid article of (b) to remove at least 30% of the water in the moist powder;
      wherein the solid enzymatic article weighs 1 to 100 grams and comprise 0.01 to 20% w/w of active enzyme protein.

2. The method of claim 1, wherein the solid enzymatic article weighs 1 to 20 g.

3. The method of claim 1, wherein the moist powder comprises at least 20% w/w of particulate dough ingredient(s) selected from the group consisting of salts, sugars, starch, ascorbic acid, and combinations thereof.

4. The method of claim 1, wherein the dough ingredient(s) include one or more oxidizing and/or reducing agent(s).

5. The method of claim 1, wherein the dough ingredient(s) include cysteine.

6. The method of claim 1, wherein the dough ingredient(s) comprise salt(s) and/or sugar(s).

7. The method of claim 1, wherein the salts are sodium chloride and/or potassium chloride.

8. The method of claim 1, wherein the sugar of (iii) and (iv) consist of 1-10 monosaccharide units.

9. The method of claim 1, wherein the sugar of (iii) and (iv) consist of 1-5 monosaccharide units.

10. The method of claim 1, wherein the sugar of (iii) and (iv) is selected from the group consisting of monosaccharides, disaccharides, trisaccharides, oligosaccharides, fructo-oligosaccharides, inulin, dextrin, maltodextrin, and combinations thereof.

11. The method of claim 1, wherein the moist powder contains at least 5% w/w of the binding agent.

12. The method of claim 1, wherein the moist powder contains 0.5 to 10% w/w active enzyme protein.

13. The method of claim 1, wherein the enzyme is one or more enzymes selected from the group consisting of amylase, lipase, hemicellulase, protease, transglutaminase, and oxidoreductase.

14. The method of claim 1, wherein the moist powder comprises 1 to 8% w/w of added water.

15. The method of claim 1, wherein the friability of the solid article is lower than 15%.

16. The method of claim 1, wherein the moist powder comprises less than 30% w/w flour.

\* \* \* \* \*